Nov. 22, 1960     G. D. PAYNTER     2,960,789
FISHING GEAR
Filed June 7, 1957
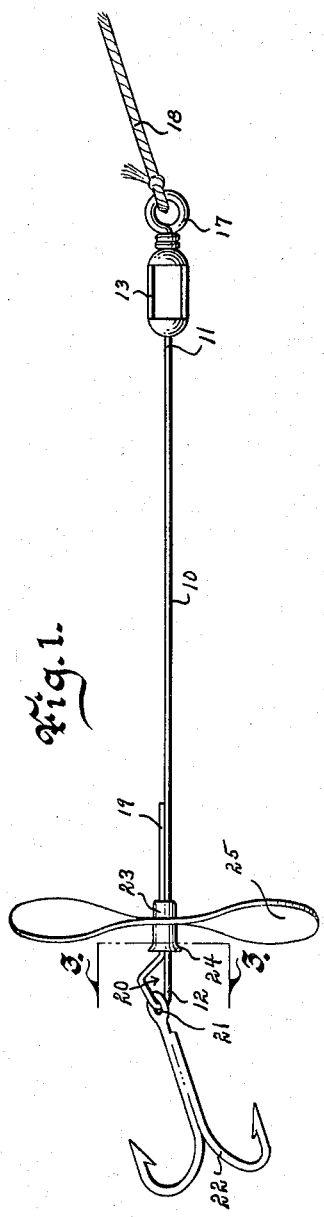
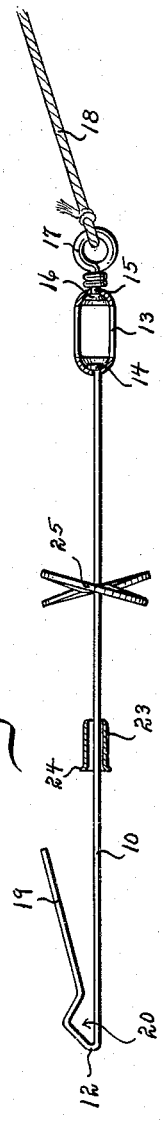
Inventor
George D. Paynter

United States Patent Office 2,960,789
Patented Nov. 22, 1960

2,960,789

FISHING GEAR

George D. Paynter, 108 N. Lincoln, Colfax, Iowa

Filed June 7, 1957, Ser. No. 664,200

2 Claims. (Cl. 43—42.08)

This invention relates to fishing gear and more particularly to a fish line leader.

The general use of a fishhook unit, a leader, and a line is old. The leader between the hook unit and the line serves two purposes, i.e., it makes possible the changing of the hook unit or lure, and inasmuch as it is usually of metal, the teeth of a caught fish cannot sever it such as might be the case with the line. Also, the leader often supports lure elements such as spoons, spinners or like. The chief problem, however, is in the removal and/or replacement of the hook unit. Usually the end of the leader holding the hook unit is of the "safety pin" type having a slidable keeper as the clasp element. Because the metal leader is round in cross section, it is most difficult to grasp the leader and its free arm area between the thumb and finger and depress the arm area closely adjacent to the leader body without the same rolling laterally and from the grasp of the fisherman.

Therefore, one of the principal objects of my invention is to provide a leader that may be easily grasped and depressed for changing hook units without the same rotating laterally during the time the free arm of the leader is being depressed and held.

More specifically, the object of this invention is to provide a metallic fishing leader that is rectangular in cross section, thereby making it possible to depress the free arm of the leader without the same objectionably rotating laterally between the finger and thumb.

A further object of this invention is to provide a leader detachably accommodating a hook unit that is more effectively held in closed condition against accidental detachment.

A still further object of my invention is to provide a leader assembly having a slidable keeper that will also act as a bearing for lure elements such as spoons, spinners and like.

Still further objects of my invention are to provide a fishing leader assembly that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my complete lure assembly ready for use,

Fig. 2 is a side sectional view of my fishing leader with the hook unit removed and in open condition, Fig. 3 is an enlarged cross sectional view of the device taken on line 3—3 of Fig. 1, and Fig. 4 is an enlarged perspective view of the trailing end of my leader and more fully illustrates its construction.

I have used the numeral 10 to generally designate the elongated strand portion of my leader made of spring metal and rectangular in cross section as shown in Fig. 4. This strand 10 has a leading end portion 11 and a trailing end portion 12. In cross section it is wider than it is thick as shown in Fig. 3. The numeral 13 designates a swivel eye having one end rotatably embracing the leading end portion of the strand 10. The numeral 14 designates a head formed on the leading end of the strand and inside the eye of the swivel. The numeral 15 designates a shaft, rotatably extending through the other end of the swivel and having a head 16 in the eye of the swivel. The numeral 17 designates an eye on the other end of the shaft 15 and secured to what is the fishing line 18.

At the trailing end portion of the strand leader is the usual free arm 19, bent laterally away from and then back toward the body of the leader to form an open eye portion 20 to detachably receive the eye 21 of a fishhook unit 22, as shown in Fig. 1. From this point the arm 19 is bent to normally extend outwardly and forwardly relative to the length of the leader, as shown in Fig. 2. This arm portion is so bent with the leader body that it and the leader body is in cross section wider than they are thick. Thus, when the free arm 19 is yieldingly forced inwardly onto the length of the leader as shown in Fig. 4, the wide width of the arm will be uppermost, and the wide width of the leader length will be lowermost with the wide width of the arm in engagement with the wide width of the leader. The numeral 23 designates the sleeve cylindrical keeper loosely slidably mounted on the leader length. To open the trailing end of the device for changing hook units, this sleeve is manually slid toward the leading end of the leader and free of the arm 19 to permit the spring tension of the arm to move it away from the leader length, as shown in Fig. 2. After the hook unit has been threaded onto the arm 19 in the usual manner, the arm 19 is manually forced to a position adjacent the length of the leader and the sleeve slid toward the trailing end of the leader to embrace the arm 19, as shown in Fig. 4. In closing the arm onto the body of the leader, these two portions are placed between the thumb and finger. Because of the rectangular cross sectional area of the leader and arm, they will not accidentally laterally roll from between the finger and thumb during this operation. I have provided a bearing shoulder flange 24 on the trailing end of the sleeve keeper for limiting the sliding movement of a lure 25 toward the trailing end of the device. The sleeve keeper serves as an excellent axle for rotatably supporting a spinning lure element as shown in Fig. 1. The lure may be slid free of the sleeve keeper by moving it toward the leading end of the leader, as shown in Fig. 2.

Still another advantage of the lure body and arm 19 being rectangular in cross section is that the corner edges of these portions engage effectively the inside wall of the sleeve keeper and thus prevent the accidental movement of the keeper sleeve toward the leading end and the unclasping of the arm 19. The flange 24 also facilitates the manual gripping of the sleeve when it is desired to move it in either direction.

Some changes may be made in the construction and arrangement of my fishing gear without departing from the real spirit and purpose of my invention, and it is my intention to cover by my claims, any modified forms of structure or use of mechanical equivalents which may be reasonably included within their scope.

I claim:

1. In a fishing gear, an elongated spring strand leader having an arm portion normally extending outwardly, over and at an angle to the length of the leader, a hook unit having an eye detachably embracing that point where said leader and arm portion are joined, a keeper sleeve slidably embracing said leader and capable of also embracing the said arm portion for holding said arm portion adjacent said leader, a flange on said keeper sleeve, and a lure rotatably mounted on said keeper sleeve; said arm portion being rectangular in cross section.

2. In a fishing gear, an elongated spring strand leader having an arm portion normally extending outwardly, over and at an angle to the length of the leader, a hook unit having an eye detachably embracing that point where said leader and arm portion are joined, a keeper sleeve slidably embracing said leader and capable of also embracing the said arm portion for holding said arm portion adjacent said leader, a flange on said keeper sleeve, and a lure rotatably detachably mounted on said keeper sleeve; said arm portion being rectangular in cross section.

References Cited in the file of this patent

UNITED STATES PATENTS

| | | |
|---|---|---|
| 473,173 | Filkins | Apr. 19, 1892 |
| 613,519 | Junod | Nov. 1, 1898 |
| 1,713,041 | Fey | May 14, 1929 |
| 1,730,333 | Pflueger | Oct. 1, 1929 |
| 2,015,616 | Clark | Sept. 24, 1935 |
| 2,162,739 | Mindek | June 20, 1939 |
| 2,482,386 | Vaisey et al. | Sept. 20, 1949 |
| 2,633,733 | Boden | Apr. 7, 1953 |
| 2,659,175 | Carpenter | Nov. 17, 1953 |
| 2,747,320 | Boland | May 29, 1956 |
| 2,785,496 | Menkens | Mar. 19, 1957 |

FOREIGN PATENTS

| | | |
|---|---|---|
| 1,133,395 | France | Nov. 19, 1956 |